(12) United States Patent
Raney et al.

(10) Patent No.: US 8,911,615 B2
(45) Date of Patent: Dec. 16, 2014

(54) RECOVERY AND SEPARATION OF CRUDE OIL AND WATER FROM EMULSIONS

(75) Inventors: Olina G. Raney, Houston, TX (US); John Hera, Jr., Sugar Land, TX (US); Duy T. Nguyen, Houston, TX (US); Michael K. Poindexter, Sugar Land, TX (US); George J. Hirasaki, Bellaire, TX (US); Clarence A. Miller, Houston, TX (US)

(73) Assignees: William Marsh Rice University, Houston, TX (US); NALCO Company, Naperville, IL (US)

( * ) Notice: Subject to any disclaimer, the term of this patent is extended or adjusted under 35 U.S.C. 154(b) by 1019 days.

(21) Appl. No.: 12/757,008

(22) Filed: Apr. 8, 2010

(65) Prior Publication Data
US 2011/0247966 A1 Oct. 13, 2011

(51) Int. Cl.
 *C10G 33/04* (2006.01)
 *B01D 17/05* (2006.01)
 *B01D 17/04* (2006.01)
 *B01D 17/02* (2006.01)

(52) U.S. Cl.
 CPC ............ *C10G 33/04* (2013.01); *C10G 2300/44* (2013.01); *B01D 17/047* (2013.01); *B01D 17/0202* (2013.01)
 USPC ............ 208/188; 208/187; 516/141; 516/143

(58) Field of Classification Search
 USPC ........... 208/187, 188; 516/134, 141, 142, 143
 See application file for complete search history.

(56) References Cited

U.S. PATENT DOCUMENTS

| | | | |
|---|---|---|---|
| 3,929,632 A * | 12/1975 | Buriks et al. | 516/174 |
| 4,209,422 A * | 6/1980 | Zimmerman et al. | 516/168 |
| 4,275,235 A | 6/1981 | Giede et al. | |
| 4,374,734 A | 2/1983 | Newcombe | |
| 4,444,654 A | 4/1984 | Cargle et al. | |
| 4,741,835 A * | 5/1988 | Jacques et al. | 210/708 |
| 4,919,846 A | 4/1990 | Nakama et al. | |
| 5,750,484 A | 5/1998 | Falbaum et al. | |
| 6,022,834 A | 2/2000 | Hsu et al. | |
| 2002/0190005 A1 | 12/2002 | Branning | |
| 2005/0085397 A1 | 4/2005 | Hou et al. | |
| 2006/0258541 A1 | 11/2006 | Crews | |
| 2008/0153723 A1 | 6/2008 | Boons et al. | |
| 2009/0149557 A1 | 6/2009 | Talingting-Pabalan et al. | |

FOREIGN PATENT DOCUMENTS

CN 1600835 * 3/2005 ............ C10G 33/00

OTHER PUBLICATIONS

English Translation of CN 1600835, obtained from Google patents, http://www.google.com/patents/CN1600835, no date.*
PCT International Search Report and Written Opinion for International Application No. PCT/US11/31049 dated May 25, 2011.
International Preliminary Examination Report for Application No. PCT/US2011/031049 dated Oct. 18, 2012.
Kazakhstan Official Action for Patent Application No. 2012/1652.1 dated Mar. 22, 2014 and English translation.
Colombian Office Action for Patent Application No. 12201490 dated Feb. 25, 2014 and English translation.

* cited by examiner

*Primary Examiner* — Renee E Robinson
(74) *Attorney, Agent, or Firm* — Tumey L.L.P.

(57) ABSTRACT

A composition and method demulsify a produced emulsion from anionic surfactants and polymer (SP) and alkali, surfactants, and polymer (ASP). The produced emulsion is demulsified into oil and water. In one embodiment, the composition includes a surfactant. The surfactant comprises a cationic surfactant, an amphoteric surfactant, or any combinations thereof.

8 Claims, No Drawings

RECOVERY AND SEPARATION OF CRUDE OIL AND WATER FROM EMULSIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to the field of enhanced oil production and recovery. More specifically, the invention relates to the field of recovery of crude oil from produced emulsions of surfactant-polymer enhanced oil recovery floods. The invention has particular relevance to the use of cationic surfactants and amphoteric surfactants to enhance oil production and recovery from these emulsions.

2. Background of the Invention

The production of crude oil from reservoirs typically results in significant quantities of non-produced crude oil remaining in the reservoir. Methods for recovering the crude oil include primary production and secondary water flooding. Several methods at various stages of development and application offer promise of recovering significant amounts of oil remaining after conventional production. Such methods include surfactant-polymer and alkali-surfactant-polymer enhanced oil recovery floods, which involve injecting combinations of these materials in brine solutions into the reservoir. Results of such methods include a produced emulsion that typically contains crude oil, water, surfactant, polymer, and alkali when used. Drawbacks include difficulties in separating the emulsion into clean water and dry oil for sale of the crude oil and proper disposal of the water in an environmentally safe manner. Moreover, demulsifiers used to separate conventional oilfield emulsions may be ineffective for some emulsions from surfactant-polymer and alkali-surfactant-polymer processes. Various experiments have shown that conventional nonionic demulsifiers may not be able to provide the desired separation for these processes. For instance, they may fail to produce water with a sufficiently low content of oil.

Consequently, there is a need for improved methods in separating the crude oil and water of the emulsions from surfactant-polymer and alkali-surfactant-polymer processes. Additional needs include improved methods for demulsifying the produced emulsion to produce a clean separation of the crude oil and water.

BRIEF SUMMARY OF SOME OF THE PREFERRED EMBODIMENTS

These and other needs in the art are addressed in one embodiment by a composition for demulsifying an emulsion comprising water and oil. In some embodiments, the emulsion comprises water, oil, an anionic surfactant, and optionally a water-soluble polymer, alkali and/or alcohol. The composition includes a surfactant. The surfactant comprises a cationic surfactant, an amphoteric surfactant, or any combinations thereof.

These and other needs in the art are addressed in another embodiment by a method of demulsifying an emulsion comprising oil and water. The method includes adding a composition to the emulsion, wherein the composition comprises a cationic surfactant, an amphoteric surfactant, or any combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

In an embodiment, a composition for recovery and separation of oil and water from produced emulsions includes a surfactant that is a cationic surfactant, an amphoteric surfactant, or any combinations thereof. In some embodiments, the surfactant is a cationic alkyl ammonium halide surfactant, an alkyl amine halide, an amphoteric surfactant, or any combinations thereof. In other embodiments, the surfactant is a cationic alkyl ammonium halide surfactant, an alkyl amine halide, a polymeric nonionic surfactant, an amphoteric surfactant, or any combinations thereof. In embodiments, the composition is used to demulsify emulsions produced by alkali-surfactant-polymer or surfactant-polymer enhanced oil recovery floods. In such embodiments, the produced emulsions typically contain at least water, crude oil, surfactants, and polymers. Addition of the composition to the produced emulsion separates the oil and water phases. In some embodiments, the separation is a clean separation of oil and water. A clean separation generally refers to dry oil with less than about 1% total sediment and water, a good interface with sharp separation between oil and water, and clean water with less than about 300 parts per million (ppm) residual oil. The composition is added to the emulsion by any suitable method. For instance, examples of suitable methods include the methods disclosed in Z. Ruiquan et al., "Characterization and demulsification of produced liquid from weak base ASP flooding," Colloids and Surfaces, Vol. 290, pgs 164-171, (2006) and U.S. Pat. Nos. 4,374,734 and 4,444,654, which are incorporated by reference in their entirety.

In an embodiment, the surfactant is a cationic surfactant comprising an ammonium halide. The ammonium halide may include any suitable types of ammonium halides. In embodiments, the ammonium halides include alkyl ammonium halides, polyalkyl ammonium halides, or any combinations thereof. In embodiments, the cationic surfactant includes any combination or at least one of an alkyl trimethyl ammonium halide, an alkyl dimethyl benzyl ammonium halide, and one or more imidazolinium halides. In embodiments, molecular weights of such quaternary surfactants are in the range of about 200 to about 700, alternatively from about 250 to about 500. In some embodiments, the alkyl trimethyl ammonium halide has an average alkyl chain length of $C_6$ to $C_{16}$, alternatively $C_6$ to $C_{10}$, and alternatively $C_{12}$ to $C_{18}$, and further alternative of $C_8$.

Without limitation, examples of alkyl trimethyl ammonium halides include alkyl trimethyl ammonium fluoride, alkyl trimethyl ammonium chloride, alkyl trimethyl ammonium bromide, alkyl trimethyl ammonium iodide, alkyl trimethyl ammonium astatide, or any combinations thereof. In an embodiment, the alkyl trimethyl ammonium halide is alkyl trimethyl ammonium bromide, alkyl trimethyl ammonium chloride, or any combinations thereof. In some embodiments, the alkyl trimethyl ammonium halide is alkyl trimethyl ammonium chloride. In other embodiments, the alkyl trimethyl ammonium halide is n-octyl trimethyl ammonium bromide.

Without limitation, examples of alkyl dimethyl benzyl ammonium halides include any combination of one or more of dodecyl dimethyl benzyl ammonium chloride and n-tetradecyl dimethyl benzyl ammonium chloride monohydrate. In embodiments, alkyl dimethyl benzyl ammonium halide comprises an average alkyl chain length of $C_{10}$ to $C_{18}$. Without limitation, examples of imidazolinium halides include any combination of one or more of methyl his (tallowamido ethyl)-2-tallow imidazolinium methyl sulfate, methyl bis(hydrogenated tallowamido ethyl)-2-hydrogenated tallow imidazolinium methyl sulfate, and methyl bis(tallowamido ethyl)-2-tallow imidazolinium methyl sulfate.

The cationic surfactant may have any desirable amount of active material. In an embodiment, the cationic surfactant has from about 30 wt. % to about 82 wt. % active material.

In an embodiment, the surfactant is an amphoteric surfactant. The amphoteric surfactant may include any amphoterics suitable for use as a surfactant in the produced emulsion. In an embodiment, the amphoteric materials are betaines, alkylamionpropionic acids, N-acyl glycinates, or any combinations thereof. In embodiments, the amphoteric materials are betaines. Any suitable betaine for use as a surfactant in the produced emulsion may be used. Without limitation, examples of suitable betaines include capryl/capramidopropyl betaine, cocobetaine, cocamidopropylbetaine, octyl betaine, caprylamidopropyl betaine, or any combinations thereof. In an embodiment, the betaine is cocobetaine. Any suitable N-acyl glycinates may be used. In an embodiment, the N-acyl glycinate is tallow dihydroxyethyl glycinate.

Embodiments further include the composition having the surfactant and a solvent. The solvent may be any solvent suitable, for example, for dissolving or suspending the surfactant. In embodiments, the solvent is water, alcohol, an organic solvent, or any combinations thereof. The alcohol may include any alcohol suitable for a solvent and for use with oil recovery. Without limitation, examples of suitable alcohols include glycol, isopropyl alcohol, methanol, butanol, or any combinations thereof. According to an embodiment, the organic solvent includes aromatic compounds, either alone or in any combination with the foregoing. In some embodiments, the organic solvent comprises an alcohol, an ether, an aromatic compound, or any combinations thereof. In an embodiment, the aromatic compounds have a molecular weight from about 70 to about 400, alternatively from about 100 to about 200. Without limitation, examples of suitable aromatic compounds include toluene, xylene, naphthalene, ethyl benzene, trimethyl benzene, and heavy aromatic naphtha (HAN), other suitable aromatic compounds, and any combinations of the foregoing. It is to be understood that the amount of surfactant in the composition in relation to the solvent may vary in some embodiments depending upon factors such as temperature, time, and type of surfactant. For instance, without limitation, a higher ratio of cationic surfactant to solvent may be used if a faster reaction time is desired. In an embodiment, the composition includes from about 100 ppm to about 20,000 ppm surfactant, alternatively from about 100 ppm to about 10,000 ppm surfactant, further alternatively from about 200 ppm to about 10,000 ppm surfactant, and further alternatively from about 200 ppm to about 500 ppm surfactant.

In embodiments, the composition is added to the produced emulsion with a polymeric nonionic surfactant. Without limitation, examples of suitable polymeric nonionic surfactants include polysorbates, fatty alcohols such as cetyl alcohol and oleyl alcohol, copolymers of polyethylene oxide, copolymers of polypropylene oxide, alkyl polyglucosides such as decyl maltoside, alkylphenol polyethylene oxide, alkyl polyethylene oxide, and ethoxylated propoxylated alkyl phenol-formaldehyde resin chemistry, or any combinations thereof. The polymeric nonionic surfactant is typically dissolved or suspended in a solvent. Any solvent suitable for dissolving or suspending a polymeric nonionic surfactant may be used. Without limitation, examples of suitable solvents include water, ether, alcohol, toluene, xylene, HAN, other suitable organic solvents, or any combinations thereof. The alcohol may include any alcohol suitable for use with oil recovery and for dissolving the polymeric nonionic surfactant. In an embodiment, the polymeric nonionic surfactant is dissolved or suspended in an organic solvent.

In an embodiment, the composition and the polymeric nonionic surfactant are added to the produced emulsion in a weight ratio of composition to polymeric nonionic surfactant from about 9:1 to about 1:1, alternatively from about 9:1 to about 1:2. In embodiments, the composition and polymeric nonionic surfactant are added about simultaneously (either as separation formulations or as part of the same formulation) or sequentially to the produced emulsion. Without being limited by theory, simultaneous addition to the produced emulsion of the composition and a polymeric nonionic surfactant generally provides improved quality of separated oil and aqueous phases. For instance, the simultaneous addition to the produced emulsion of the composition comprising a cationic surfactant (i.e., alkyl trimethyl ammonium halide) and water with a polymeric nonionic surfactant dissolved in an organic solvent improved the quality of the separated oil and aqueous phases.

The foregoing may be better understood by reference to the following examples, which are intended for illustrative purposes and are not intended to limit the scope of the invention.

Example 1

In the example, demulsification of produced emulsions containing crude oil were conducted. The produced emulsions also contained a produced brine. All chemicals except deionized water were weighed using an ACCULAB SV-100 weighing scale. To produce the brine, in a 5-gallon container, deionized water was added and placed under a HEIDOLPH RZR 2051 control stirrer. The amounts and types of the additives for each brine produced are shown in Table 1 below. The mixer was turned on, and salts were added followed by polymer. The particles were made to be discrete by slowly tapping in the polymer (about 15 minutes for an 8 liter solution) with vigorous stirring and making sure the polymer did not form clumps. The mixing was continued for an hour. Pre-weighed surfactant PETROSTEP® S-1 (the sodium salt of a propoxylated branched alcohol sulfate) was added followed by pre-weighed surfactant PETROSTEP® S-2 (the sodium salt of an internal olefin sulfonate) and alcohol. PETROSTEP® is a registered trademark of Stepan Chemical Company Corporation. The solution was stirred for 30 minutes to finalize the brine. PETROSTEP® S-1 and S-2 were available from Stepan Chemical.

To produce the crude-oil produced water emulsion, a prescription bottle was marked at 70 and 100 ml levels. Brine was added to the 70 ml mark. A bottle of crude oil was mixed well by shaking and then 30 ml of crude oil was placed into the prescription bottle to the 100 ml mark. The prescription bottles of emulsion were placed in EBERBACH shakers on high speed for 10 minutes.

The anionic polymer FLOPAAM® 3330, a 30% hydrolyzed 8 mM molecular weight polyacrylate polymer is a registered trademark of S.N.F., S.A. Corporation. Isobutyl alcohol at 99.4% purity was used. Sodium chloride of greater than 99.9% purity was used, and calcium chloride used was of 99% purity. Further details on other products used are shown in Table 2.

Pure cationic surfactants of the alkyl trimethyl ammonium bromide series were obtained from Alfa Aesar. Water used for the solution preparation was deionized.

Results and Discussion

A majority of the demulsification studies were performed using a 70/30 volume ratio of the produced brine and crude oil. Several studies were also performed using a 90/10 volume ratio of the produced brine and crude oil. The brine contained surfactant micelles but did not appear to have any liquid crystalline phases as indicated by absence of birefringence.

Effect of Various Cationic and Nonionic Surfactants

The addition of a pure cationic surfactant, n-octyl trimethyl ammonium bromide ($C_8TAB$) and cationic A were studied at differing dosage levels. A clear separation of the aqueous phase was found around 200 ppm $C_8TAB$. The addition of 200 ppm cationic surfactant n-octyl trimethyl ammonium bromide to brine did not appear to produce any precipitation or form any observable solids. Also, heating the mixture of 200 ppm cationic surfactant with brine to 40° C. did not produce any precipitation of solids.

Effect of Pure Cationic Surfactants $C_8$ Trimethyl Ammonium Bromide, $C_8$Tab, and Ethoxylated Resin B Bottle tests were performed using $C_8$ trimethyl ammonium bromide, $C_8TAB$ and ethoxylated resin B, an ethoxylated resin somewhat similar to ethoxylated resin C mentioned below, at 100, 200, and 300 ppm dosage levels. The emulsions were made using 70/30 and 90/10 brine/crude oil ratios.

Analysis of the basic sediment and water of the separated crude oil obtained after 2 hours and 45 minutes equilibration time indicated $C_8TAB$ was effective above 200 ppm in dewatering oil and removing oil from water. At these levels, the $C_8TAB$ was found to reduce the water content in the oil to 0.8 vol. %. Ethoxylated resin B was found to be effective above 100 ppm in dewatering oil, reducing the water content to 0.4 vol. % after equilibration for 2 hours and 45 minutes.

Effect of Selected Amphoteric Surfactants

Amphoteric surfactants were screened for effectiveness in demulsification. The results indicated that cocobetaine used alone at dosage levels of 75 ppm and 100 ppm showed significant clearing of water phase after 21 hours of equilibration time and appeared to be more effective than the combination of 50 ppm ethoxylated resin C and 50 ppm cocobetaine. Cocoaminopropionic acid at 200 ppm also proved effective in clearing the water phase. Other amphoterics were tested, but cocobetaine and cocoaminopropionic acid gave the best results.

The water phase of the system with 50 ppm ethoxylated resin C and 50 ppm $C_8TAB$ system appeared clear after 21 hours of equilibration time and appeared to perform better in the removal of oil from the aqueous phase than the cocobetaine systems.

Use of pure cationic surfactant $C_8TAB$ at 200 ppm produced an improved aqueous phase when visually compared to cocaminopropionic acid and cocobetaine. However, comparison with the systems with combinations of ethoxylated resin C and surfactants indicated improved demulsification when such combinations were used.

Aqueous phases that were visually best were found to be in the order: 50 ppm ethoxylated resin C and 50 ppm $C_8TAB$, 50 ppm ethoxylated resin C and 100 ppm $C_8TAB$, 50 ppm ethoxylated resin C and 100 ppm cocobetaine, 200 ppm $C_8TAB$, 50 ppm ethoxylated resin C and 100 ppm cationic A, 200 ppm cocoaminopropionic acid, and 200 ppm cocobetaine.

CONCLUSIONS

Ethoxylated resin B, an ethoxylated resin, was found to be effective in reducing the water content to 0.4 vol. % in the oil phase at 100 ppm, 200 ppm, and 300 ppm levels after 2 hours and 45 minutes of equilibration time while the aqueous phase contained visibly significant quantities of oil even after several hours of equilibration. Ethoxylated resin C, a similar resin, was also effective in cleaning the water phase when used alone.

At 200 ppm and 300 ppm levels, the cationic surfactant n-octyl trimethyl ammonium bromide, $C_8TAB$, after 2 hours and 45 minutes of equilibration time, reduced the level of water in the oil phase to 0.8 vol. % while also reducing oil levels in the aqueous phase to significantly lower levels.

TABLE 1

| Produced Brine Formulations to make 100 g Brine | |
| --- | --- |
| | brine |
| NaCl (grams) | 1.0 |
| $CaCl_2 \cdot 2H_2O$ (grams) | 0.1834 |
| (Ca++, ppm) | 500 |
| FLOPAAM ® 3330S (grams), 8 MM MW HPAM | 0.12 |
| PETROSTEP ® S-1 (15.86% active; grams*) | 0.9458 |
| PETROSTEP ® S-2 (22.49% active; grams*) | 0.2223 |
| Iso-butyl alcohol (R-3041; grams) | 0.4 |

*weight of surfactants as received

TABLE 2

| Product Information | | | | |
| --- | --- | --- | --- | --- |
| Product | Supplier | Chemical Type | % Actives | Molecular Weight |
| PETROSTEP ® S-1 | Stepan Chemical | N67-7PO sulfate, Na salt | 15.86 | 760 |
| PETROSTEP ® S-2 | Stepan Chemical | IOS, Na salt | 22.49 | 370 |
| $nC_8$ Trimethylammonium bromide ($C_8TAB$) | Lancaster Chemicals | Cationic surfactant | 97 | 252.24 |
| Ethoxylated resin C | Nalco | Ethoxylated resin | 67 | 4,400 |

TABLE 2-continued

| | | Product Information | | |
|---|---|---|---|---|
| Product | Supplier | Chemical Type | % Actives | Molecular Weight |
| Cationic A | Nalco | Cationic alkyl dimethylammoniumbenzyl chloride | 82 | 349 |
| Cationic D | Nalco | Cationic unquateraized polyamine surfactant | 67 | 1,204 (Mw); 930 (Mn) |
| Ethoxylated resin B | Nalco | Resin oxyalkylate | 70 | 4,600 |

Example 2

In the example, demulsification of produced emulsions containing crude oil were conducted. The produced emulsions were for an SP process. The testing was a standard demulsifier bottle test as set forth in Treating Oilfield Emulsions, pages 36-41, issued by Petroleum Extension Service, the University of Texas at Austin, Tex. (4$^{th}$ Ed., 1990), which is incorporated by reference herein in its entirety. The testing was conducted at room temperature with a settling time of 240 minutes. The specifics and results of the tests are set forth in Table 3. The percent sediment and percent water remaining in the oil at the end of the test were measured by taking a sample of oil from 15 mls above the interface, then centrifuging for 3 minutes at high speed. As centrifuging alone may not separate all of the emulsion (especially micro emulsion) and water from the sample, % slug was used to ensure that all of the emulsion was separated from the sample as sediment and/or water for an accurate measurement. The % slug was the total amount of oil and water measured in the oil sample after the previously centrifuged sample was treated with a high level of a special "slugging" demulsifier, then remixed, re-centrifuged, and sediment and water were again measured.

line 12, tallow dihydroxyethyl glycinate and line 8, cocobetaine. These products showed very low values of % sediment and water after centrifuging (also called a grindout). These products also showed very low % slug indicating the best oil quality. Among these products, cationic A showed the best water quality of the products in this test at 70 ppm residual oil-in-water. In contrast, the untreated "blank" sample showed 2.0% sediment, 9.0% water, 10% slug, and 548 ppm residual oil-in-water. In view of these bottle test results, the product in line 16 was the product recommendation to test in the particular system. In other systems, one skilled in the art may choose another product based on the particular characteristics of the system.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any defini-

TABLE 3

Bottle Test Results
Laboratory Prepared EOR Emulsion on 100 ml Emulsion Samples
EOR Brine with West Texas Crude Oil: (70:30 v/v)

| | Nalco | Chemical | | Thief Grindout @ 240 Minutes | | | Oil-in-Water |
|---|---|---|---|---|---|---|---|
| Line | Product | Description | ppm | % Sediment | % Water | % Slug | ppm |
| 8 | 317-40H | Cocobetaine | 200 | 0.8 | trace | 0.76 | 218 |
| 12 | 317-40M | Tallow dihydroxyethyl glycinate | 200 | 0.8 | trace | 0.76 | 94 |
| 15 | 317-40Q | Oleyl betaine/lauryl betaine | 200 | 0.8 | trace | 0.6 | 114 |
| 16 | Cationic A | Alkyl dimethyl-ammoniumbenzyl chloride | 200 | 0.78 | 0.0 | 0.42 | 70 |
| 17 | Ethoxylated resin B | resin oxyalkyate | 200 | 0.8 | trace | 0.8 | 146 |
| 18 | Blank | no chemical | 0 | 2.0 | 9.0 | 10.0 | 548 |
| 19 | Cationic D | Cationic unquaternized polyamine surfactant | 200 | 0.76 | 0.24 | 0.8 | 110 |

The objective of the bottle test was to identify a product that yielded sales quality oil (e.g., 1% maximum total sediment and water) and clean water (e.g., 300 ppm residual oil-in-water to prevent issues with re-injection, but the lowest oil-in-water value possible was desirable.) If total sediment and water values were the same using different demulsifiers, the product that yielded the lower sediment value was better, as sediment in this test was unresolved emulsion. As shown in Table 3, above, the most effective demulsifiers in this test were shown in line 16, cationic A; line 17, ethoxylated resin B; line 19, cationic D; line 15, oleyl betaine/lauryl betaines;

tions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein and parent or continuation patents or patent applications, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of demulsifying an emulsion comprising oil and water, the method comprising: adding a composition to an oil-in-water emulsion, wherein the composition comprises a combination of a cationic alkyl ammonium halide surfactant and an amphoteric betaine surfactant comprising cocoaminopropionic acid, wherein the composition further comprises from about 100 ppm to about 20,000 ppm cationic alkyl ammonium halide surfactant, and wherein the halide of the cationic alkyl ammonium halide surfactant does not comprise chlorine.

2. The method of claim 1, wherein the cationic alkyl ammonium halide surfactant comprises n-octyl trimethyl ammonium bromide.

3. The method of claim 1, further comprising adding a polymeric nonionic surfactant to the emulsion.

4. The method of claim 3, wherein a ratio of the combination of the cationic alkyl ammonium halide surfactant and the amphoteric betaine surfactant to the polymeric nonionic surfactant is in a weight ratio of about 9:1 to about 1:2.

5. The method of claim 4, wherein the polymeric nonionic surfactant and the composition are added about simultaneously to the emulsion.

6. The method of claim 1, wherein the emulsion is a produced emulsion from a surfactant-polymer enhanced oil recovery flood.

7. A method of demulsifying an emulsion comprising oil and water, the method comprising: adding a composition to an oil-in-water emulsion, wherein the composition comprises a combination of a cationic alkyl ammonium halide surfactant and an amphoteric betaine surfactant, wherein the composition further comprises from about 100 ppm to about 20,000 ppm cationic alkyl ammonium halide surfactant, wherein the halide of the cationic alkyl ammonium halide surfactant does not comprise chlorine, and wherein the composition further comprises an organic solvent.

8. The method of claim 7, wherein the organic solvent comprises an alcohol, an ether, an aromatic compound, or any combinations thereof.

* * * * *